United States Patent [19]
Voracek

[11] Patent Number: 5,451,301
[45] Date of Patent: Sep. 19, 1995

[54] DEVICE FOR ELECTROACTIVATING FLUIDS AND PREPARATIONS CONSISTING OF ELECTROACTIVATED FLUIDS

[76] Inventor: Pavel Voracek, Vikingavagen 3B, S-223 76, Lund, Sweden

[21] Appl. No.: 781,197
[22] PCT Filed: Jun. 13, 1990
[86] PCT No.: PCT/SE90/00410
§ 371 Date: Jun. 7, 1993
§ 102(e) Date: Jun. 7, 1993
[87] PCT Pub. No.: WO90/15779
PCT Pub. Date: Dec. 27, 1990

[30] Foreign Application Priority Data

Jun. 13, 1989 [SE] Sweden .................. 8902134

[51] Int. Cl.⁶ ........................................ C02F 1/46
[52] U.S. Cl. .............................. 204/151; 204/164
[58] Field of Search .............. 204/151, 252, 263, 164

[56] References Cited

U.S. PATENT DOCUMENTS

| | | | |
|---|---|---|---|
| 2,756,202 | 7/1956 | Clarke | 204/151 |
| 2,882,210 | 4/1959 | Jenks | 204/151 |
| 3,342,717 | 9/1967 | Leduc | 204/263 |
| 4,172,774 | 10/1979 | Moeglich | 204/151 |

FOREIGN PATENT DOCUMENTS

| | | |
|---|---|---|
| 932269 | 8/1955 | Germany . |
| 2218121 | 10/1972 | Germany . |
| 2173818 | 10/1986 | United Kingdom . |

*Primary Examiner*—John Niebling
*Assistant Examiner*—Arun S. Phasge
*Attorney, Agent, or Firm*—Pollock, Vande Sande & Priddy

[57] ABSTRACT

Device for the electroactivation of a fluid (1), preferably a somewhat saliferous solution, having a pH value of 6-8, with two electrodes (3,4) that are lowered into the fluid (1) and a thin membrane (5) which has a very small electrical conductivity and is mounted in a way such that the fluid (1) is divided into two separated volumes (7,8). During electroactivation of the fluid (1) on the electrodes (3,4) is applied, preferably during 3-20 minutes, a direct-current voltage (6) with virtual value 50-500 V.

The invention also relates to preparations consisting of the mentioned volumes (7,8), which after ceasing of the application of voltage on the electrodes (3,4) have essentially the same pH value as had the fluid (1) before the application of voltage, but present totally different effects on biological material.

5 Claims, 1 Drawing Sheet

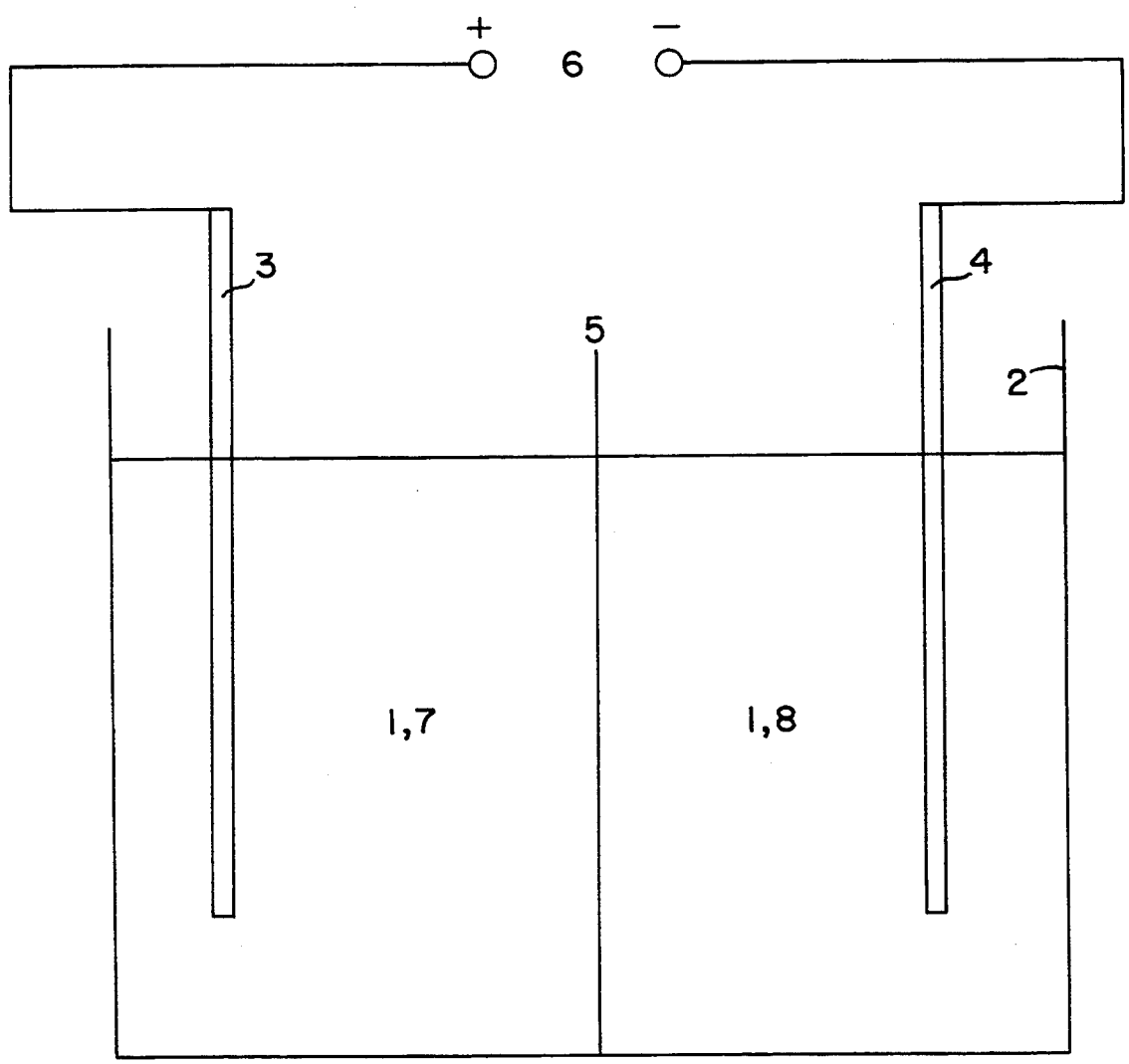

5,451,301

DEVICE FOR ELECTROACTIVATING FLUIDS AND PREPARATIONS CONSISTING OF ELECTROACTIVATED FLUIDS

The invention concerns a device for electroactivating a fluid by means of electrodes, which are lowered into said fluid, and a thin membrane, with small electrical conductivity, which is placed between said electrodes thus dividing said fluid into two separated volumes. This electroactivation is a process which changes the properties of said fluid without altering the pH value of the fluid before, during or after applying voltage on the electrodes. The invention also relates to preparations consisting of said fluid having been electroactivated, the fluid thereby being divided into two separate fractions having properties that differ, especially regarding their respective influences on biological material.

BACKGROUND OF THE INVENTION

During electrolysis with a porous, electrically conducting diaphragm which is placed between the electrodes, around the positive electrode-the anode, a fraction is produced with lower pH and, around the negative electrode the cathode, a fraction is produced with higher pH than the pH of the electrolytic solution before the start of the electrolysis. It has been shown that these two fractions, the acid one and the alkaline one, have biologically dampening and stimulating effects respectively. These different effects have in recent research works, e.g. according to the Soviet article "Neozjidannaya voda" by V. Latysjev in Izobretatel i ratsionalisator 1981:2, been regarded as being respectively dependent of the acid and alkaline state of the fractions. The author of said article e.g. claims that said fractions have positive effects on the healing of wounds, the treatment of eczema and cutaneous irritations etc.

By using the present invention it has been found that effects similar to the above-mentioned ones also exist in electrolytic solutions which have gone through electroactivation, i.e. a process after which the pH value of respective fractions does not differ notably from the pH value of the original electrolytic solution. Contrary to what has been claimed earlier the applicant for the present invention has found that the mentioned biological effects do not depend on the pH value of respective fraction, but on below described, and earlier not investigated, processes. These processes also prevail during conventional electrolysis, but have earlier not been investigated because they are "overshadowed" by the electrolysis itself.

Electroactivation according to the present invention is thus not the same as electrolysis.

THE PURPOSE OF THE INVENTION

The invention aims at, with the help of the below described device, performing electroactivation of fluids consisting of electrolytic solutions, preferably somewhat saliferous solution, each of which after said electroactivation has the same pH value as the original electrolytic solutions. Each one of said fractions has its own, clearly distinguishable and different, biological effects. The fields of application for these fractions are numerous e.g. within human and veterinary medicine, biochemical industry, cosmetology, plant growing and raising.

DESCRIPTION OF FIGURES AND EMBODIMENTS

FIG. 1 shows a preferred, but in no way limiting, embodiment of the invention in which 1 is an electrolytic solution, preferably a somewhat saliferous solution, 2 is a container, which is not electrically conducting and in which is placed said electrolytic solution 1, 3 and 4 are two chemically solid electrodes, which can be given positive and negative potential respectively, 5 is a membrane, that consists of a thin, and only to a small extent electrically conducting, material.

With the device according to this embodiment is performed as follows:

The container 2 is filled with an electrolytic solution 1, which in this case consists of 800 ml of somewhat saliferous water with a pH value of 7.6, whereafter during a time of about 8 minutes between the electrodes 3 and 4 is applied a direct-current voltage 6, which in this case is pulsating and has a virtual value of 220 V and a frequency of 2×50 Hz. If a membrane is not introduced into the container 2 then the electrical resistance of the electrolytic solution 1 is equal to about 10 k$\Omega$. If on the other hand a membrane 5, in this case made of HD (High Density) Polyethylene, e.g. MIKROTEN, with a thickness of 15 $\mu$m, is introduced between the electrodes 3, 4 in such a way that the electrolytic solution 1 is divided into two separated volumes 7 and 8 then said electrical resistance, mainly consisting of the electrical resistance of the membrane 5, at first is 1.5–2 M$\Omega$ and the current intensity is around 250 $\mu$A. After about 2 minutes said electrical resistance increases to around 15 M$\Omega$ while simultaneously said current intensity during continuing strong variations decreases to 15–60 $\mu$A.

A charge Q, which during said application of voltage passed between the electrodes 3 and 4, mainly was transmitted during the first two minutes of voltage application and can therefore be calculated according to the following well-known correlation, whereby are used approximate values of current and time:

$$Q = I \times t \approx 100 \, \mu A \times 10^2 s = 10^{-2} C.$$

The pH value is changed only about $10^{-2}$ pH units, which is a change that is extremely difficult to measure. Neither can after said electroactivation any change in pH value be detected in any of the volumes 7 and/or 8.

The fractions around the positive electrode 3 and around the negative electrode 4 are henceforth called anode fraction 7 and cathode fraction 8 respectively. These two fluids after electroactivation have pH values, which in a notable way do not differ from the pH value of the electrolytic solution 1 before electroactivation.

In another embodiment, not shown, the device according to the present invention is provided with organs enabling easy refilling of the electrolytic solution 1 and easy draining of anode fraction 7 and cathode fraction 8. Regardless of the fact that there exist no, at present, measurable differences in physical or chemical property between the anode fraction 7 and the cathode fraction 8 and between the original electrolytic solution 1 and each one of the fractions 7 or 8 the cathode fraction 8 causes totally other effects than the anode fraction 7. The fractions 7 and 8 also cause other effects than the original electrolytic solution 1.

The effects caused by the fractions 7 and 8 have, according to what is shown below, been identified when the electrolytic solution 1 consists of somewhat saliferous water with pH 7.6, the properties and effects of which are well-known and are not discussed in this application.

The anode fraction 7 has proved to usually dampen the metabolism and reproduction of biological material. Among others the following effects have been established:

- by external use putting an end to keratitis and conjunctivitis (5–10 times faster than by using antibiotics),
- by external use increasing the surface tension of the skin, which causes a cosmetic effect similar to what is achieved by using a conventional face pack,
- by at first external and thereafter internal use alleviating and curing effects on tonsilitis, cold, influenza, cough, torticollis, hemicrania (migraine), tension headache, epileptic headache, liver disease, articular ache, epidermophytosis of the feet, eczema, intestinal infections, diarrhoea, colic, constipation, haemorrhoids, prostatic adenome, burn injuries, radiculitit, neuritis, anal fissures, traumatic wounds, inflammations and mucous membrane wounds,
- dampening of fermentative processes, seed germination etc.

The cathode fraction 8 has proved to usually support the metabolism and reproduction of biological material. Among others the following effects have been established:

- by external use regeneration of the epithelium layers of cornea and conjunctiva after ceasing of a prior inflammation,
- by external use increase in the metabolism and flowing through of blood in the skin,
- by internal use increase in the metabolism and immune defence of human and animal bodies,
- supporting of fermentative processes, seed germination etc.

In practical use the anode fraction 7 and the cathode fraction 8 are used in combination, so that e.g. the anode fraction 7 is used to interrupt a pathological process, e.g. an inflammation, whereafter the cathode fraction 8 is used to speed up regeneration of the affected tissue.

The established effects of the fractions 7 and 8 possibly could be explained with hitherto unknown chemical or physical differences between the two fractions or between these and the original electrolytic solution 1. The very small difference in pH value, which is calculated in accordance with the above relation, between the fractions 7 and 8 and between these and the original electrolytic fraction 1 is in this connection anyhow negligible and is not influencing the above described effects of the fractions 7 and 8.

Differences and similarities between conventional electrolysis and the above-mentioned electroactivation are briefly described below.

During conventional electrolysis using an electrically conducting diaphragm, which is placed between the electrodes, the electrolyte concentration around each electrode is successively reduced as time goes. This takes place as a consequence of the rule which states that electroneutrality is to prevail in each volume element of the electrolytic solution. As time goes areas with successively decreasing electrolytic concentration propagate towards the diaphragm.

The above-mentioned electroneutrality rule is anyhow not deduced theoretically but is simply a conclusion based on observations. This circumstance implies a possibility that there in the electrolytic solution could prevail extremely small divergences from electroneutrality, which divergences do have biological effects but can hardly be measured with existing methods. Such divergences probably arise during conventional electrolysis in the areas having successively decreasing electrolyte concentration. These divergences have an adjacent analogy and possible explanation in the recently observed statical friction in gases, which prevails in spite of the thermal movements of the gas molecules.

The mass of the electrochemically obtained precipitation, which mass depends on the total electrical charge that during conventional electrolysis passes through the electrolytic solution, to a great extent influences the pH value of the anode and cathode fraction in such a way that these two fractions show acide and alkaline reaction respectively.

During the above-mentioned electroactivation according to the invention instead of a diaphragm with high electrical conductivity, that is used during conventional electrolysis, is utilized a polymeric membrane 5 with low electrical conductivity. When voltage is applied on the electrodes 3 and 4 the membrane 5 is charged, almost like a capacitor, while the voltage in the electrolytic solution 1 becomes very small. The potential gradient in the membrane 5 increases considerably, in the described case to 220 V/15 $\mu m \approx 15$ kV/mm, causing the ions to penetrate the membrane 5 from each side and leave it on the opposite side. Thus the membrane 5 acts like an ionic pump.

On both sides of the membrane 5 there is a striving towards deficiency of one kind of ions and towards excess of the other kind od ions. As nature strives towards electroneutrality the excesses of ions are pressed from the two sides of the membrane through the electrolytic solution 1 towards the adjacent electrode 3 or 4. Also in this case prevail the above-described divergences from electroneutrality. In this process the potential gradient in the electrolytic solution 1, being around 10 mV/mm, only has a marginal influence as it is $1.5 \times 10^2$ times weaker than the above mentioned potential gradient in the membrane 5. The mentioned low potential gradient in the electrolytic solution 1 thus is not sufficient to overpower the forces which exist in the electrolytic solution 1 and which are analogous to static friction forces. For this reason the electric current flowing between the electrodes 3 and 4 rather is a consequence of the fact that the divergences from electroneutrality must not exceed certain threshold values than an effect resulting from the above-mentioned potential gradient in the electrolytic solution 1.

It should be mentioned that $H^-$—$OH^-$— ions, which exist in all kinds of water, including distilled water, should be classified among the above-mentioned ions, which possibly are involved in the divergences from electroneutrality. For this reason also distilled water could be regarded as an electrolytic solution.

As a result of the above-mentioned process the whole volume of the electrolytic solution 1 is activated. The mentioned ion excess is first neutralized around each electrode, which explains the mentioned low current of some tens of $\mu A$. As the electrical charge which has passed through the electrolytic solution 1 during the above-mentioned electroactivation is very small no conventional electrolysis has taken place. Consequently no measurable change in pH value is apparent.

During tests in practice it has become clear that an unused membrane 5 of the kind mentioned above causes a higher current through the electrolytic solution 1 than a membrane which earlier has been used for electroactivation. This is due to the fact that during the usage of a new membrane this is saturated with solvates/ions originating from the electrolytic solution 1. After having reached saturation the membrane 5 causes the low current through the electrolytic solution 1. After finished electroactivation the saturation level of the membrane 5 is reduced. Anyhow in the membrane 5 always remains a certain level of saturation. As the diffusion of solvates-/ions from the membrane 5 takes place regardless of the polarity of the solvates/ions, the above-mentioned reduction in the saturation level of the membrane 5 has no influence on the properties which the fractions 7 and 8 achieved through the electroactivation.

The biological effects that have been shown for the above-mentioned fractions 7 and 8 can possibly be explained by the influences these fractions have on cellular membranes and thereby on cellular metabolism etc. The above described processes which occur in the vicinity of the membrane 5 are therefore likely to take place in reverse order in biological cells, whereby the above-mentioned biological effects appear.

The invention has been described above according to a preferred embodiment making use of a HD polyethylene membrane with thickness 15 μm, somewhat saliferous water with pH value 7.6, a direct-current voltage with virtual value 220 V and frequency 2×50 Hz and a treatment time of around 8 minutes. During tests in practice it has become apparent that the above-mentioned fractions 7 and 8 have essentially the same effects also at the following test conditions, which conditions in each separate case are combined in such a way that no disruptive discharge is produced in the membrane:

the membrane 5 is any thin polymeric membrane which has a very small electric conductivity,
the thickness of the membrane 5 is 5–50 μm,
the electrolytic solution 1 is practically any solution with a pH between 6 and 8,
the virtual value of the direct-current voltage 6 is 50–500 V,
the frequency for the direct-current voltage 6 is arbitrary and might be zero,
the treatment time is 3–20 minutes.

I claim:

1. Method for electrical treatment of an electrolytic solution (1) wherein said solution is a water solution with a low content of salt and having a pH between 6 and 8, and for preparation of fractions from said electrolytic solution (1), characterized in that the electrolytic solution (1) is placed in an electrically nonconducting container (2), that two chemically solid electrodes (3,4), of which the first one (3) is positive electrode and the second one (4) is negative electrode, are lowered into said electrolytic solution (1), that between the electrodes (3,4) is inserted a thin membrane (5), made from material having a very small specific electrical conductivity which is of the same magnitude as the specific electrical conductivity for High Density Polyethylene when immersed in said electrolytic solution and having a thickness of 5–50 μm, which membrane (5) divides the electrolytic solution (1) into two separated volumes (7,8) of which the first volume (7) contains the positive electrode (3) and the second volume (8) contains the negative electrode (4), that on the electrodes (3,4) is applied a direct-current voltage (6) having virtual value 50 V–500 V, and that said direct-current voltage (6) is applied on the electrodes (3,4) during a time of 3–20 minutes, and wherein said electrical conductivity is such that the resulting pH of said two separated volumes is the same as the pH of the said electrolytic solution at the start of said method.

2. The method of claim 1 wherein said thin membrane is made from high density polyethylene.

3. The method of claim 1 wherein said direct-current voltage has a virtual value of 220 V.

4. The method of claim 1 wherein said direct-current voltage is applied on the electrodes for 8 minutes.

5. The method of claim 1 wherein said thin membrane has a thickness of 15 μm.

* * * * *